Patented Dec. 23, 1952

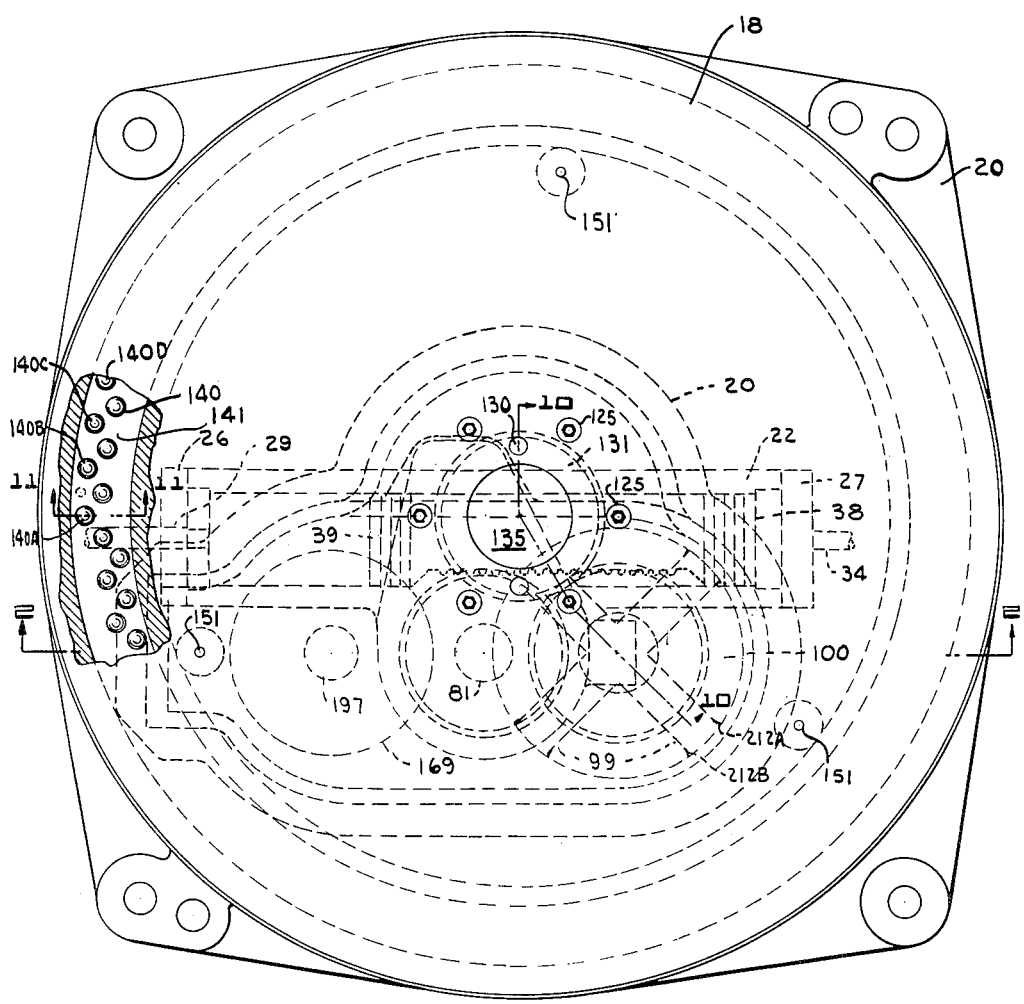

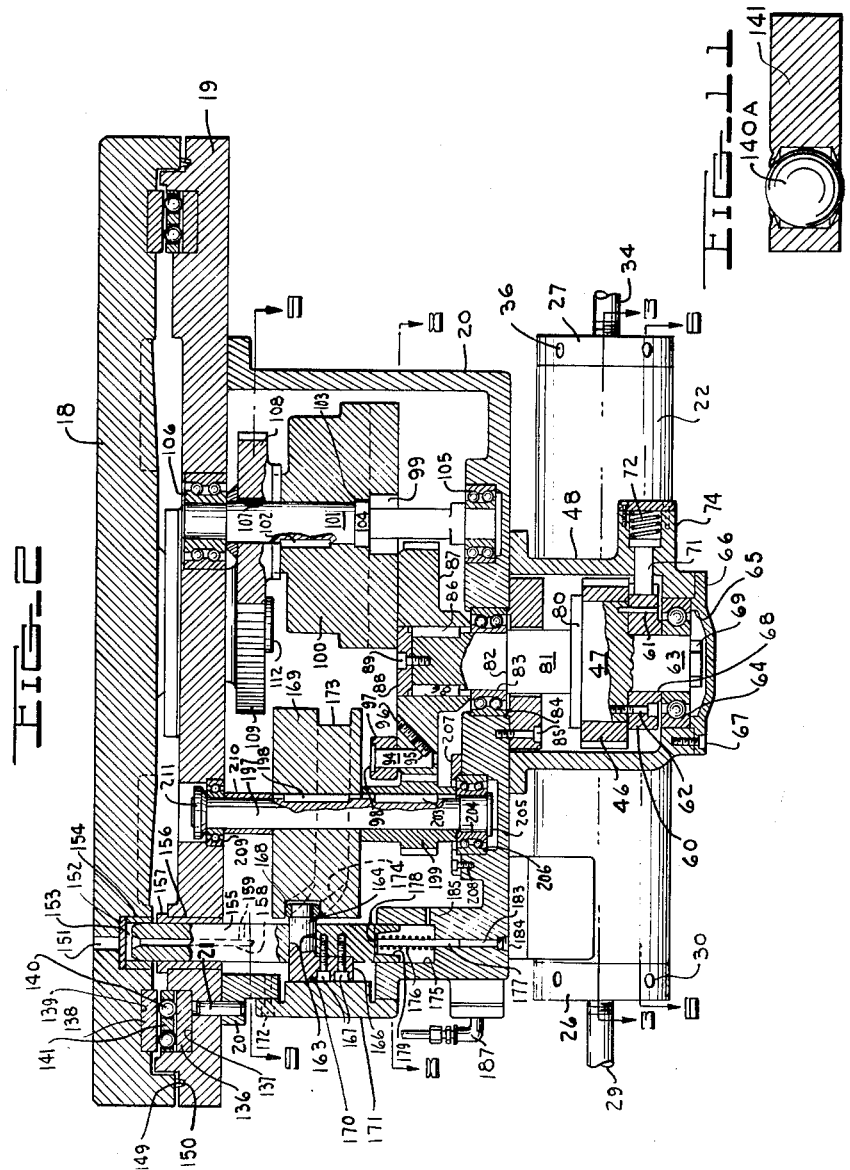

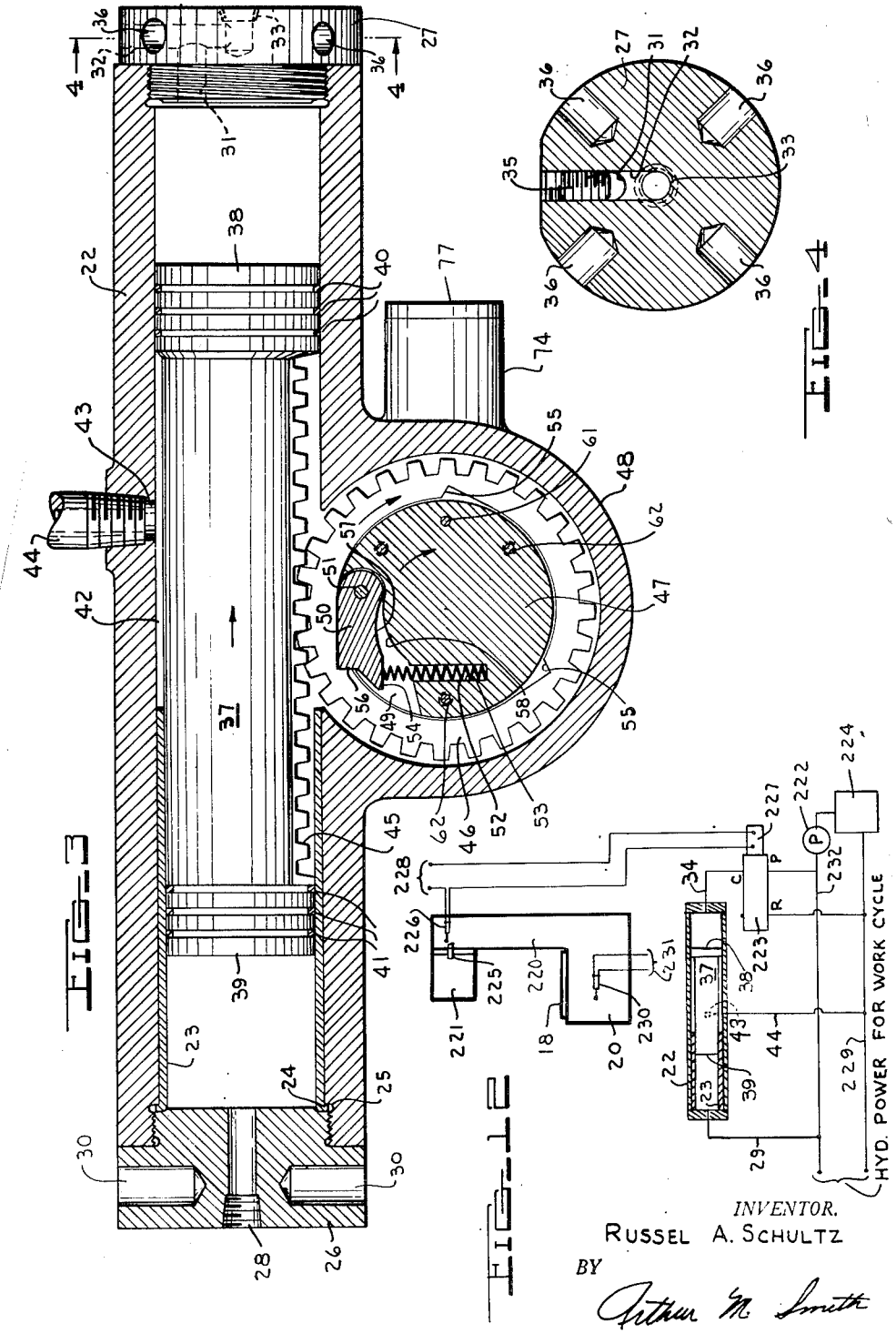

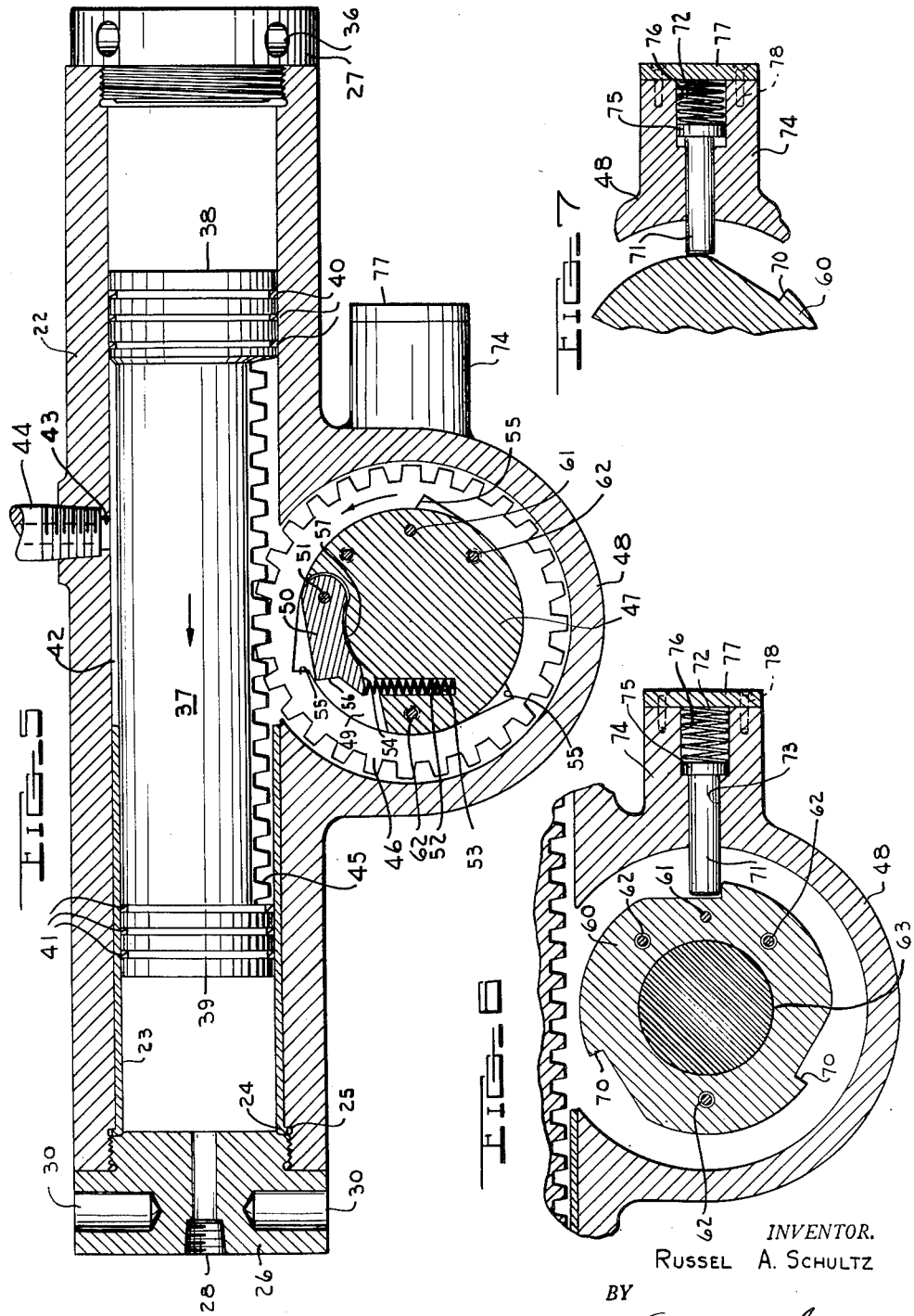

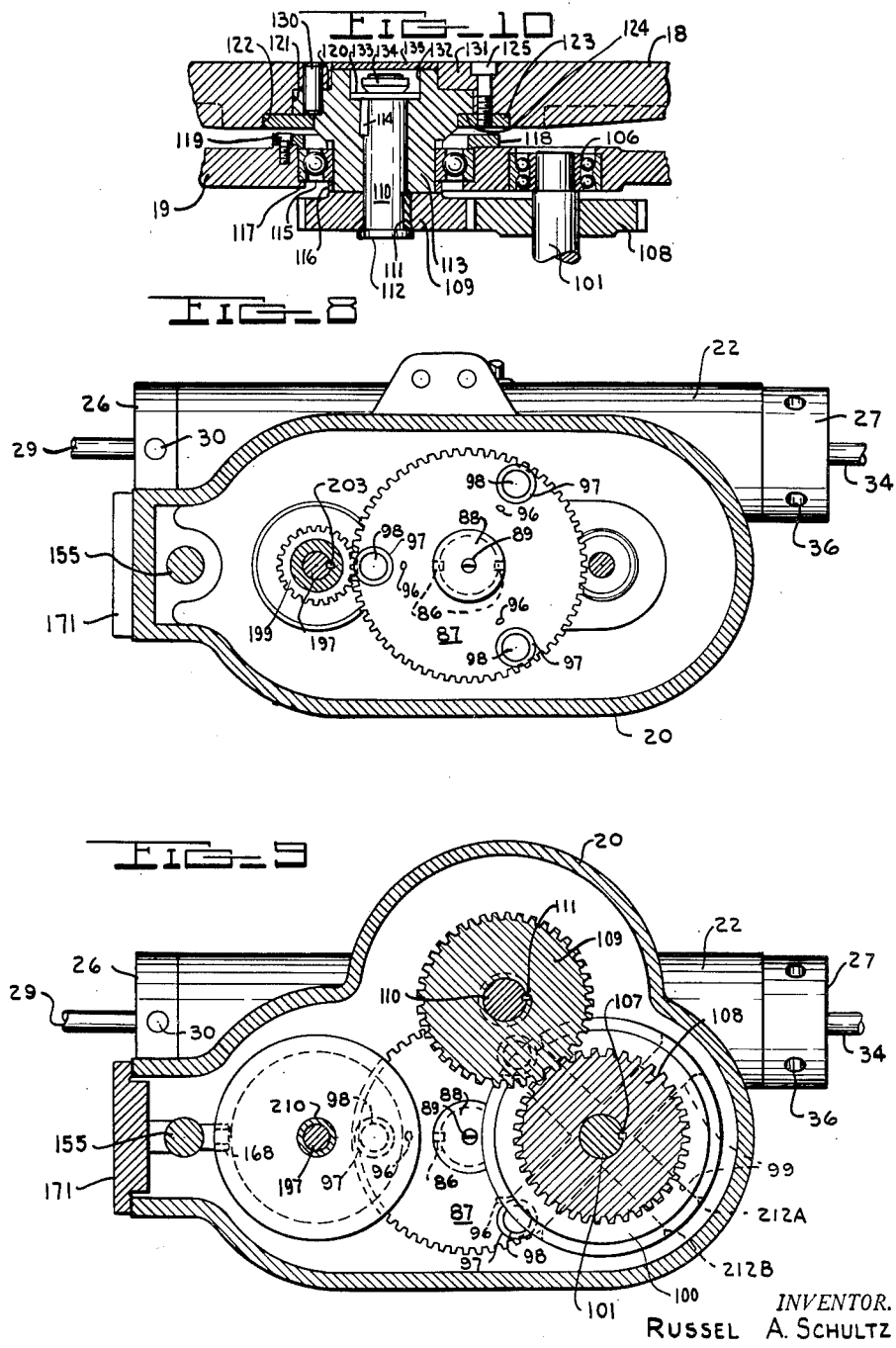

2,622,487

UNITED STATES PATENT OFFICE 2,622,487

INDEXING TABLE

Russel A. Schultz, Detroit, Mich., assignor to Robbins Engineering Company, Detroit, Mich., a corporation of Michigan Application December 23, 1947, Serial No. 793,490

6 Claims. (Cl. 90—58)

The present invention relates to improvements in an indexing machine comprising a rotatable indexing table and drive mechanism therefor wherein the table, adapted to carry one or more workpieces, pilots on a central drive hub and is successively indexed from one work station to another to permit an independently operated work machine to perform a work operation on the workpiece at the indexed position. The underportion of the table provides indexing holes which selectively mate with an indexing pin carried by the table's supporting frame structure so as to accurately locate the table at a desired work station.

It has long been common in the interest of economy to adapt a single hydraulic pressure generator for supplying hydraulic pressure to both the table indexing mechanism and also to the work machine which performs the work operation on the workpiece carried by the table. Obviously, no work load is upon the work machine while the indexing table is rotating from one work station to the next. It is thus feasible and economical to utilize the single hydraulic pressure generator to actuate the indexing mechanism and rotate the table from one work station to the next while the work machine is idling. Efficient utilization of the frequently expensive machinery involved demands that the work cycle should start immediately upon completion of the indexing movement. At the same time, where a simple reciprocating type of hydraulic actuator is employed to operate the indexing mechanism, it is necessary to return the reciprocating indexing actuator to its initial position, as at the start of the indexing movement, in preparation for the succeeding indexing movement.

Prior to the present invention, difficulty has been experienced in utilizing the hydraulic pressure from a single hydraulic pressure generator for the dual purpose of returning the reciprocating indexing actuator to its initial position, as at the start of the indexing cycle, and of simultaneously commencing the work cycle. The hydraulic fluid required to return the indexing actuator to its initial position in preparation for the succeeding indexing movement is bled from the hydraulic pressure which is required to initiate the work cycle. Unless the hydraulic pressure generator is sufficiently oversize to overcome the resulting loss in hydraulic pressure during the return stroke of the indexing actuator, a delay of several seconds is experienced at the beginning of each work cycle. The employment of an oversize hydraulic pressure generator in order to compensate for overloads of short duration is an obviously uneconomical use of capital equipment and adds to overhead and maintenance costs. Similarly, a delay of several seconds for each work cycle is a matter of vital concern, particularly in work operations of short duration and occurring several times per minute.

Accordingly, an important object of the present invention has been to provide an improved indexing machine wherein a reciprocating hydraulically actuated indexing mechanism completes its return movement simultaneously with the operation of the work cycle without appreciably bleeding hydraulic pressure from the work machine, yet is powered from the same hydraulic pressure generator which supplies pressure to the work machine.

As a result of blacklash in the indexing drive gears, tolerances in the bearings, and various sources of play in the drive mechanism, difficulty has been experienced prior to the present invention in securing accurate alignment of the indexing holes carried by the table and the said indexing pin upon successive increments of rotation. In order to achieve proper alignment of the table after each indexing movement, costly and high precision machinery was required to reduce the tolerances in the indexing mechanism.

Accordingly, another important object of the present invention is to provide an improved indexing machine wherein the indexing table is mounted essentially as above described and may be rotated freely relative to the central drive hub for prelocation at the proper position of alignment between the indexing holes and the indexing pin, the table being thereafter readily and adjustably clamped to the central drive hub for rotation therewith, and being thereafter positively secured to the said hub for rotation therewith upon ascertaining that the table is properly aligned with respect to the indexing mechanism, thereby providing an improved, highly efficient, yet relatively economically manufactured indexing table and drive mechanism.

Another object of the present invention is to provide a method for aligning an indexing table of the character described with its indexing drive mechanism, whereby the table is first adjustably mounted on its central drive hub until properly positioned with respect to the indexing mechanism so as to compensate for backlash and tolerances in the driving mechanism, and thereafter positively secured to the drive hub for rotation therewith.

Indexing machines of the character described are usually costly precise mechanisms not readily subject to mass production methods of manufacture. Inasmuch as different manufacturing operations for which the table is suited require different increments of indexing movement of the table, it has long been desirable to achieve an indexing machine which may be utilized with a table adapted for any of the indexing movements ordinarily required in manufacturing operations.

Accordingly, another object of the present invention is to provide an indexing machine which may be readily adapted for indexing a table through two or more indexing movements for each complete revolution of the table.

Indexing tables of the character described are frequently of considerable weight in themselves and are adapted to support heavy workpieces. The weight of the table and the workpieces thereon and the vertical forces of the work operation are conventionally supported by load supporting bearings between the table and its supporting frame structure. In the normal course of operation, continued indexing of the table and the load carried by the bearings tend to wear and groove the bearing races.

Accordingly, another object of the present invention is to provide an indexing machine having an improved bearing support for the indexing table, wherein the weight of the table is evenly distributed over a plurality of ball bearing surfaces and wherein the optimum wearing area of the bearing races is utilized to minimize wear and grooving of the races.

Other objects of this invention will appear in the following description and appended claims, reference being had to the accompanying drawings forming a part of this specification wherein like reference characters designate corresponding parts in the several views.

In the drawings:

Fig. 1 is essentially a top view of an indexing machine embodying the present invention, portions of the table being broken away to show details of the table bearing support.

Fig. 2 is essentially a fragmentary vertical section with parts broken away, taken in the direction of the arrows along the line 2—2 of Fig. 1.

Fig. 3 is essentially an enlarged fragmentary horizontal section taken in the direction of the arrows along the line 3—3 of Fig. 2, showing the hydraulic indexing drive mechanism during the indexing movement or stroke.

Fig. 4 is essentially a vertical section through the right cylinder head closure insert taken in the direction of the arrows along the line 4—4 of Fig. 3.

Fig. 5 is a similar section to that shown in Fig. 3, but showing the indexing drive mechanism during the return movement or stroke.

Fig. 6 is essentially an enlarged fragmentary horizontal section through the detent ring shown at the end of the indexing stroke and taken in the direction of the arrows along the line 6—6 of Fig. 2.

Fig. 7 is essentially the same section as Fig. 6, but showing only a fragmentary portion thereof with the detent ring and plunger in position during the indexing stroke.

Fig. 8 is essentially a fragmentary horizontal section taken in the direction of the arrows along the line 8—8 of Fig. 2, showing the indexing gear and indexing roller pins thereon in elevation.

Fig. 9 is essentially a fragmentary horizontal section through the table drive gear and taken in the direction of the arrows along the line 9—9 of Fig. 2.

Fig. 10 is essentially a fragmentary vertical section through the table drive hub and taken along the broken line 10—10, Fig. 1, in a direction essentially normal thereto.

Fig. 11 is essentially a fragmentary enlarged section through the roller bearing retaining ring, taken in the direction of the arrows along the line 11—11 of Fig. 1.

Fig. 12 is essentially a schematic plan of a hydraulic system suitable for use with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown by way of example in the drawings wherein a removable work holding indexing table 18 is rotatably mounted on the stationary table support 19, which latter is positively aligned and secured with the frame 20 by the plurality of dowels 21, Figs. 1 and 2. Indexing of the table 18 is effected by the reciprocating hydraulic unit which is essentially enclosed by the cylindrical chamber 22, Fig. 2, and is shown in detail in Figs. 3 and 5. The internal diameter of the leftward portion of the cylinder 22 is reduced by the cylindrical sleeve insert 23 having the annular retaining bead flange 24 at one end thereof and abutting the annular shoulder 25 provided by the cylinder 22.

Cylinder head closure inserts 26 and 27 are screw-threaded into opposite ends of the cylinder 22. The internal portion of the head 26 abuts the sleeve insert 23 at the bead 24 to positively lock the sleeve 23 in position. Hydraulic fluid is fed into the left end of the cylinder 22 through the duct 28 provided by the head 26 and which is adapted for a screw-threaded connection with a hydraulic fluid supply conduit 29, Fig. 2. Removal or tightening of the head 26 is facilitated by the plurality of circumferentially spaced spanner wrench holes 30 extended radially into the cylindrical surface of the head 26.

Details of the construction of the closure head 27 are shown in Figs. 3 and 4 and include the hydraulic fluid duct 31 communicating with the cylinder 22 and extended partially into the head 27 to communicate with the radially extending duct 32. The inner end of the radially extending duct 32 communicates with the duct 33, which latter leads to the exterior of the head 27 and is adapted for making a screw-threaded coupling with the hydraulic fluid supply conduit 34, Fig. 2. The radial duct 32 is screw-threaded for the adjustable screw-threaded plunger valve 35 provided for regulating the amount of opening between the ducts 31 and 32, Fig. 4, so as to afford a control over the rate of flow of hydraulic fluid to and from the cylinder 22. The head 27 is removed or tightened in place by means of the plurality of circumferentially spaced spanner wrench holes 36.

A double-headed plunger having the reduced body portion 37 reciprocally movable within the cylinder 22 provides the enlarged piston head 38 at its right end within the cylinder 22 and the piston head 39 at its reduced end within the sleeve insert 23. A plurality of piston rings 40 and 41 are provided around piston heads 38 and 39 respectively. As the enlarged head 38 moves to the left in Figs. 3 and 5, air or oil compressed within the annular space 42 between the reduced plunger body portion 37 and the inner wall of the cylinder 22 is released via the port 43 within the sidewall of the cylinder 22 and communicating with conduit 44 screw-threaded into the port 43. In the preferred embodiment shown, the conduit 44 communicates with a hydraulic fluid reservoir. Hydraulic fluid is thus drawn into the space 42 upon movement of the plunger 37 to the right and is forced from the space 42 upon movement of the plunger 37 to the left, thereby lubricating the cylinder 22.

One side of the reduced body portion 37 between the piston heads 38 and 39 provides the gear rack 45 in gear-driving relation with the pinion gear 46, the latter being rotatably mounted on the ratchet driven head 47 within the gear housing 48 provided as a lateral projection of the cylinder wall 22. The ratchet driven head 47 provides a cut-out portion 49 for the pawl 50, which latter is pivotally secured at 51 to the driven head 47 and is spring-pressed against the internal periphery of the gear 46 by the spring 52. The spring 52 is supported within the spring retaining opening 53 provided in the driven head 47 and has its free end pressed against the spring abutment surface 54 of the pawl 50.

The internal periphery of the pinion gear 46 also provides a plurality of ratchet teeth 55 adapted to engage the face 56 of the pawl 50 when the gear 46 is driven clockwise. When the driven head 47 is held against rotation, by means described below, and the gear 46 is rotated counterclockwise, the pawl 50 is pivotally moved against the resiliency of the spring 52 until the arcuate surface 57 of the pawl 50 is pivotally moved against the arcuate seat 58 provided therefor by the driven head 47, Fig. 5.

Also enclosed within the housing 48, below and concentric with the ratchet driven head 47, is the detent ring 60, Figs. 2 and 6, which is aligned with and secured to the driven head 47 for rotation therewith by the dowel 61 and plurality of screws 62. A spindle 63, integral with the driven head 47, extends concentrically downward therefrom through the ring 60 and is rotatably supported at its lower portion by the roller bearing 64. The outer race of the bearing 64 is supported from below by the annular bearing seat 65 of the cover plate 66, which latter is secured to the housing 48 by the plurality of screws 67. The annular boss 68 of the detent ring 60, Fig. 2, rests on and is supported by the inner race of the bearing 64. The lower extremity of the spindle 63 provides the nut head 69 which permits rotation of the ratchet driven head 47, upon removal of the plate 66, without recourse to the hydraulically actuated driving system including gear rack 45 and pinion gear 46.

The detent ring 60 also provides the plurality of essentially right angle notches 70 for engaging the detent plunger 71. The latter is spring pressed against the outer periphery of the ring 60 by the spring 72, Figs. 6 and 7. The body of the plunger 71 is slidably mounted within the opening 73 provided therefor within the projection 74 of the gear housing 48 and is held in position by the resiliency of the spring 72 pressed against the enlarged flange head 75 of the plunger 71. The head 75 is slidable within the opening 76 provided for the spring 72 and head 75. The end of the spring 72 farthest from the head 75 is held in position by the plate 77 secured to the projection 74 by the plurality of screws 78. Clockwise rotation of the detent ring 60, effected by rotation of the gear rack 45 to the right in Figs. 3 and 5, is permitted by the detent plunger 71 which is moved against the compression of the spring 72 to follow the periphery of the ring 60, Fig. 7. Counter-clockwise rotation of the ring 60 is prevented at fixed positions where the plunger 71 engages any one of the notches 70.

The spindle 63 and integral ratchet driven head 47 are supported by an annular retaining flange 80, concentric and integral with the spindle 63 and resting upon the upper surface of the pinion gear 46, Fig. 2. Extended upward from the retaining flange 80 as an integral continuation of the spindle 63 is the upright spindle 81 which provides the annular supporting shoulder 82 for the inner race of the double row roller bearing 83 within which the upper portion of the spindle 81 is journaled. The outer race of the bearing 83 is supported within the frame 20 from below by the annular bearing support 84 mounted around the spindle 81 and secured to the frame 20 by the plurality of screws 85. Supported by the inner race of the bearing 83 and keyed by the keys 86 to the upper portion of the spindle 81 for rotation therewith is the large indexing gear 87. The keys 86 are retained in place by the key cap 88 which in turn rests on the hub of the gear 87 and is secured to the upper portion of the spindle 81 by the screw 89, Figs. 2 and 3.

The indexing gear 87 carries the plurality of indexing pins 94, three in the present instance, Figs. 2 and 8, which extend upright from holes provided therefor within the periphery of the said indexing gear 87. Each pin 94 provides an annular retaining groove 95 near its lower portion for receiving the lower extremity of one of the angularly disposed set screws 96 which is screw-threaded into the upper face of the gear 87 to lock the pin 94 in place. A roller 97 is rotatably mounted on the extension of each pin 94 above the gear 87 and is held in place by the enlarged pin head 98 counterbored into the roller 97.

The rollers 97 are adapted for moving into the four radial symmetrically spaced cam grooves 99 provided therefor in the undersurface of the cam hub 100, Figs. 2 and 9, and thereby to rotate the cam hub 100 by a Geneva motion upon rotation of the indexing gear 87. The cam hub 100 is mounted on and keyed to the vertical shaft 101 for rotation therewith by the key 102, and is supported by its annular internal shoulder 103 which rests on the mating flange 104 provided by the shaft 101. The lower end of the shaft 101 is supported by and journaled in the double row roller bearing 105 mounted in the frame 20. The upper portion of the shaft 101 supports and is journaled in the upper double row roller bearing 106 mounted in the table support 19. Also mounted on and keyed by the key 107 to the shaft 101 for rotation therewith is the gear 108 which is supported by the cam hub 100 and is in geared engagement with the central table driving gear 109, which latter is mounted on and rotatable with the table drive shaft 110, Fig. 10. The gear 109 is keyed to the shaft 110 by the key 111 and is supported from below by the annular flange 112 at the lower extremity of the shaft 110, Fig. 10. The gears 108 and 109 are readily removable from their respective shafts 101 and 110 and may be replaced by corresponding gears of different diameter ratios to effect different indexing characteristics for the table 18.

The shaft 110 is keyed by the key 114 to the table hub 113 for rotation thereof. The lower portion of the hub 113 is rotatable within the roller bearing 115, which is supported and spaced from the gear 109 by the annular spacer 116 and is also supported by the annular flange 117 provided by the table support 19. The bearing 115 is held in place from above by the annular retaining ring 118 secured to the support 19 by the plurality of screws 119.

The upper periphery of the hub 113 is recessed to provide the annular shoulder 120 which fits within the annular undercut 121 provided therefor in the undersurface of the table 18. A second and larger annular recess 122 is provided within the underside of the table 18 for the clamping ring 123, which also fits within a recess 124 around the hub 113 and undercutting the shoulder 120. Thus the clamping ring 123 underlies portions of both the table 18 and the shoulder 120 of the hub 113 and is adapted to clamp the table 18 and hub 113 securely together upon tightening the plurality of bolts 125 having their bolt heads counterbored within the top of the table 18 and being extended through the table 18 for screw-threaded engagement with the clamping ring 123.

By the structure described, it is possible to rotate the table 18 relative to the hub 113 to any desired position of alignment while the ring 123 is loose. The table 18 and hub 113 are then clamped by the ring 123 for rotation together as a unit upon tightening the bolts 125. Dowel holes for the dowel pins 130 are then drilled and reamed into the table top flange 131 and the shoulder 120 underlying the flange 131, Figs. 1 and 10. The dowels 130 are then inserted to provide a positive drive between the indexing table 18 and hub 113.

A screw-threaded upper extremity of the shaft 110 extends through the body of the hub 113 and into a counterbored portion 132 thereof. The washer 133 rests upon the base of the counterbore 132 around the shaft 110 and is secured in place by the nut 134 screw-threaded on the said threaded upper extremity of the shaft 110, thereby holding the shaft 110 in place within the hub 113. A capping plate 135 fitting flush with the top of the table 18 covers the counterbore 132.

The weight of the table 18 is supported by a large circumferential multiple ball bearing having the lower bearing way 136 seated within the annular seat 137 provided by the table support 19, Figs. 1 and 2. The upper bearing way 138 is seated within the annular seat 139 provided therefor within the underside of the table top 18. The ball bearings 140 are arranged within their retaining ring 141, Fig. 11, along one continuous spiral which extends around the table 18 essentially three times. Starting with the ball 140A and moving spirally clockwise around the table 18, each succeeding ball 140B, C, D, etc., along the spiral is spaced circumferentially and slightly radially inward from the preceding ball. Accordingly, no two balls 140 track along the same portions of the ways 136 and 138 and the optimum wearing efficiency for the ways 136 and 138 is achieved. The multiple spiral arrangement of the balls 140 provides an important improvement in machines of the character described by distributing the weight of the relatively heavy table 18 over the maximum wearing area of the ways 136 and 138 and thereby reducing wear and grooving of the said ways 136 and 138. Radially outward from the bearings 140 and extended circumferentially around the underportion of the table 18 is the felt oil seal 149 within the annular groove 150 provided therefor by the table support 19.

A plurality of vertical openings 151 within the top of the table 18, three in the present instance, are separated by the hardened partitions 152 from the corresponding plurality of stop-pin openings 153 within the underside of the table 18. Each stop pin opening 153 is lined by a hardened cylindrical sleeve bushing 154, Fig. 2. A vertically movable stop pin 155 rides within the cylindrical sleeve bushing 156, which latter is inserted within an opening provided therefor within the table support 19 and is held in place by its upper peripheral bead flange 157. The radial distances of the stop pin 155 and each of the stop pin holes 153 from the center of the table 18 are the same, so that upon successive increments of rotation of the table 18, the pin 155 may be successively aligned with each hole 153 in turn. The upper portion of the stop pin 155 is also adapted for precisely fitting within each of the bushings 154, thereby providing means for "plugging" and positively aligning the table 18 with respect to the support 19 at preselected indexed positions.

The escape of air compressed within the stop pin hole 153 upon entry of the pin 155 is permitted by the central air escape duct 158 extending longitudinally of the pin 155 from the upper end thereof and communicating with the exterior of the pin 155 via the lower radial duct 159. The openings 151 in the top of the table 18 permit the operator of the machine to locate the positions at which the pin 155 plugs the table 18 and thereby to avoid drilling into the pin 155 while securing a workpiece on the top of the table 18, or during a work operation. Likewise, the hardened partitions 152 also serve as a safeguard against accidentally drilling through the top of the table 18 and into the pin 155.

The central portion of the body of the pin 155 provides a transverse cylindrical opening 163 for the cylindrical portion 164 of a roller mounting, and also provides a longitudinally extending flattened portion for abutment by a corresponding flat portion 166 of the said roller mounting, which latter is secured to the stop pin 155 by the plurality of screws 167. A cam guided roller 168 is rotatably mounted on the reduced extremity of the cylindrical portion 164 and rides within the cam groove of the cylindrical rotatable cam 169 for guided reciprocating vertical movement. Rotation of the stop pin 155 is prevented by the sliding contact between the plane exterior surface of the flat portion 166 of the roller mounting and the plane abutment surface 170 of the plate 171 secured to the frame 20 by the plurality of screws 172. The cam groove extends continuously around the cylindrical periphery of the cam 169 and includes the horizontal portion 173 and the double inclined portion 174 for raising and lowering the roller 168 upon rotation of the cam 169.

The lower end of the stop pin 155 rides within the cylindrical guide opening 175 provided therefor within the frame 20 and is spring-pressed upward by the coil spring 176 around the spring guide shaft 177. The spring 176 is compressed between the bottom of the guide opening 175 and the enlarged head 178 of the shaft 177, the latter being pressed upward against the base of the inverted cup-shaped depression 179 within the lower extremity of the stop pin 155. The body of the shaft 177 rides in the guide opening 183 provided therefor within the frame 20 and which is plugged at its lower extremity by the detachable screw-threaded plug 184. Similar in purpose to the air escapement ducts 158 and 159, the duct 185 extends through the frame 20 from the lower portion of the guide opening 175 to permit the escape of compressed air as the lower end of the pin 155 descends. Part of the lubricating system 187 for the machine is shown in Fig. 2, but is not considered a feature of the present invention and is therefor not considered in detail herein.

The cam 169 is mounted on and keyed to the shaft 197 by the key 198 and rests upon the hub of the gear 199, which latter is mounted on and keyed by the key 203 to the shaft 197 for rotation thereof and is in gear-driven engagement with the indexing gear 87. The under portion of the hub of the gear 199 rests on the inner race of the double row bearing 204, within which the lower end of the shaft 197 is journaled. The flange 205 at the base of the shaft 197 rests below the inner race of the bearing 204. The outer race of the bearing 204 is supported within the frame 20 from below by the shoulder 206 and is capped above by the annular cap 207 secured to the frame 20 by the plurality of screws 208. The upper portion of the shaft 197 is journaled in the bearing 209 which is supported within the table support 19 and spaced above the cam 169 by the sleeve spacer 210 around the shaft 197. The upper end of the shaft 197 is screw-threaded and projects through the bearing 209 to receive the screw-threaded retaining nut 211.

In connection with the operation of the stop pin 155 in plugging one of the holes 153 while the table is at the indexed position, the peripheral portions of the four cam grooves 99 which receive the roller pins 97 are slightly rounded at 212A and 212B, as shown in Figs. 1 and 9. Accordingly, upon each indexing of the cam hub 100, the gear 87 can rotate approximately 30° at the end of its indexing stroke, as effected by the plunger 37, without rotating the cam hub 100. By virtue of the essentially three to one ratio between the diameters of the gears 87 and 199, the cam 169 will be rotated essentially 90° during the same time. During this 30° period, when the cam hub 100 and likewise the table 18 are stationary, the stop pin 155 plugs and is withdrawn from the hole 153 by operation of the cam 169.

The size and spacing of the roller pins 97 and the curvature of the portions 212A and 212B are adapted so that the cam hub 100 is under the positive control of the rollers 97 at all times. Accordingly, the curved portions 212A and 212B are engaged by the entering and emerging rollers so as to positively lock the cam hub 100 against movement until the emerging roller pin 97 leaves its cam groove 99 and the entering roller pin 97 is in the straight portion of its cam groove 99 so as to be in complete control of the cam hub 100.

In operation of the present invention, the hydraulic fluid ducts 29 and 34 leading to opposite ends of the cylinder 22 are suitably connected with a controlled source of hydraulic pressure. It is apparent from the structure shown that upon entry of hydraulic fluid under pressure into the left end of the cylinder 22, and upon the simultaneous release of the pressure at the right end of the cylinder 22, the double piston plunger 37 is moved to the right, thereby rotating the gear 46 and ratchet driven head 47 clockwise by virtue of the aforesaid operable linkage including the gear rack 45, ratchet teeth 55, and pawl 50.

The stroke of the plunger 37 is adapted for rotation of the ratchet driven head 47 through essentially one-third of a revolution. Rotation of the head 47 also rotates the integral spindles 63—81 and attached detent ring 60 through one-third of a revolution from one indexed position to the next. At the end of the indexing stroke or clockwise rotation, the detent ring 60 reaches the position shown in Fig. 6 whereat the spring-pressed detent plunger 71 engages one of the right angle notches 70 to prevent counter-clockwise or return rotation of the ring 60, attached head 47, and spindles 63—81 during the return or leftward stroke of the plunger 37.

During each indexing stroke and clockwise rotation of the indexing mechanism, including the head 47, detent ring 60, and spindles 63—81, the indexing gear 87, keyed with the spindle 81, is also rotated essentially one-third of a rotation, and the cam hub 100 is indexed through a quarter of a revolution by the aforesaid Geneva motion effected by one of the three rollers 97 within one of the cam grooves 99. Each increment of clockwise indexing rotation of the gear 87 carries one of the rollers 97 essentially from its position of entry into one of the cam grooves 99 to the position whereat the roller 97 breaks contact with the cam groove 99 at the curved peripheral portion thereof. Simultaneously, the succeeding roller 97 is carried to the position for entry into the succeeding cam groove 99. The table 18, keyed to the hub 113 by the plurality of dowels 130, is also indexed from one work station to the next during the same movement by virtue of the aforesaid operable linkage between the table 18 and cam hub 100.

As described above, the table is stationary during essentially the last 30° of the indexing movement of the gear 87, permitting the cam driven stop pin 155 to plug and to be withdrawn from the stop pin opening 153 which is brought over the stop pin 155 by the indexing movement of the table 18. Thus the table 18 is positively indexed in proper alignment for the work operation, and the stop pin 155 is left at its lowered position at the end of the indexing movement to permit the successive indexing movement of the table 18 at the end of the work operation.

In the present instance, the table 18 is adapted for rotation through essentially 120° upon each indexing movement. Other indexing increments of rotation are frequently desired and may be readily achieved merely by replacing the gears 108 and 109 in the table drive mechanism with similar gears of different diameter ratios. Thus, the present invention provides a universal indexing mechanism which may be readily modified for use with tables adapted for indexing any ordinarily required number of times, from two to at least sixteen, during one complete revolution. When the manufacturer of the machine receives an order for an indexing table and drive mechanism therefor adapted for indexing a stated number of times during a single revolution of the table, it is only necessary to supply the proper sized gears 108 and 109 and to provide the table 18 with the proper number of stop pin holes 153. The remainder of the indexing mechanism remains unchanged.

Upon completion of each indexing stroke of the plunger 37 to the right, the plunger 37 is hydraulically driven to the left so as to return the gear rack 45 to its leftward starting position for engaging the next succeeding ratchet tooth 55 with the pawl 50 in preparation for the next driving or indexing stroke, which follows after a time interval determined by the duration of the work cycle.

It is to be remembered that while the table 18 is at each indexed position, an independent work machine performs a work operation on the workpiece carried by the table 18. For the sake of economy, it is desirable to employ a single hydraulic pressure generator to power both the work machine and the table indexing mechanism. Inasmuch as the work machine is not under load during the indexing movement of the table 18, no problem arises concerning the distribution of the available hydraulic pressure between the indexing mechanism and the work machine. Upon completion of the indexing stroke, it is desirable for efficient operation that the return stroke of the indexing mechanism takes place during the work cycle. In order to avoid competition between the indexing mechanism and the work machine for the available hydraulic pressure from the pressure generator, the present invention utilizes a hydraulic control system shown diagrammatically in Fig. 12, in cooperation with the effective area differential between the pistons 38 and 39.

The interrelation between the hydraulic power for the indexing mechanism and for the work cycle are diagrammatically shown in Fig. 12. The table 18 is shown mounted on its frame 20, which latter also comprises the base of the machine column 220 which supports the vertically movable saddle 221. The saddle 221 carries a tool head, not shown, which performs a work operation on a workpiece, not shown, carried by the table 18. The hydraulic system and electrical control circuits for powering and controlling the work cycle are not considered part of the present invention and are accordingly only shown schematically herein.

The pressure generator pump 222 is directly connected through the hydraulic lines 232 and 29 to the small end of the cylinder 22, and is operatively connected to the large end of the cylinder 22 through the four-way valve 223 and the duct 34. It is also to be noted herein that the duct 44 communicates with the hydraulic return line 229 to the reservoir 224.

Upon completion of the work cycle, the saddle 221 moves upward on the machine column 220 to permit indexing of the table 18 and the bringing of a succeeding workpiece to the work station under the saddle 221. At the upper limit of movement of the saddle 221, the finger 225 thereof trips and closes the limit switch 226, thereby energizing the solenoid 227 and actuating the four-way valve 223 to connect the valve port C to R, Fig. 12, and thereby to connect the large end of the cylinder 22 with the hydraulic reservoir 224 via the hydraulic return duct 229. The solenoid 227 may be energized from a conventional 110 volt 60 cycle electrical power source 228.

Upon release of the pressure at the large end of the cylinder 22, the hydraulic pressure on the small piston 39 drives the plunger 37 to the right and completes the indexing stroke. As a safety feature, the limit switch 230 in the work cycle control circuit 231 is open during the indexing movement of the table 18 to prevent operation of the work cycle and downward movement of the saddle 221 while the table 18 is indexing between stations. Upon completion of the indexing movement of the table 18, the limit switch 230 is closed to permit operation of the work cycle control circuit 231. At the beginning of the work cycle, the saddle 221 moves downward toward the work table 18 and the finger 225 rides off the limit switch 226. The latter opens and de-energizes the solenoid 227, permitting the four-way valve 223 to return to its rest position with the valve port C connected to P and with the cylinder duct 34 connected with the pressure duct 232.

By virtue of the sleeve 23 and the resulting area differential between the piston heads 38 and 39, it is possible to effect the return stroke of the plunger 37 to the left without appreciably drawing upon the available power output of the hydraulic pressure generator 222. The hydraulic duct 29 to the left end of the cylinder 22 need never be disconnected from the hydraulic pressure line 232. Upon completion of the indexing stroke to the right, it is only necessary to connect the duct 34 with the hydraulic pressure line 232 through the vlave 223. The plunger 37 will then be driven to the left merely as a result of the unbalanced forces on the pistons 38 and 39 and without appreciably taxing the output of the hydraulic pressure generator 222. In this situation, with both ducts 29 and 34 at opposite ends of the cylinder 22 connected with the output side of the pressure generator 222, hydraulic fluid taken from the pressure line 232 for entering the right end of the cylinder 22 is replaced by a substantially corresponding amount of hydraulic fluid returning to the pressure line 232 from the left end of the cylinder 22. Thus the return stroke of the indexing drive mechanism operates without appreciably bleeding hydraulic fluid from the system required to operate the work cycle.

An obvious advantage of the mechanism and hydraulic system described is that the return stroke of the plunger 37, i. e., to the left, may operate simultaneously with the work cycle without unduly competing for the available power output of the pressure generator 222. If, for example, the hydraulic duct 29 at the left end of the cylinder 22 were suddenly released to the hydraulic reservoir 224 and the duct 34 at the right end of the cylinder 22 were connected to the hydraulic pressure generator 222, i. e., just the reverse of the situation when the plunger 37 is driven to the right during the indexing stroke, a large proportion of the output of the hydraulic pressure generator 222 would be taxed and the operation of the work cycle would be correspondingly delayed until the plunger 37 reached the end of its leftward stroke. Although, in the present instance, an area differential is achieved between the pistons 38 and 39 by reason of the sleeve insert 23, it is apparent that the area differential may be readily effected in other ways. For example, the sleeve 23 may be eliminated and both pistons may have the same diameter. The plunger 37 may then be adapted to extend through piston 39 and out through the cylinder head closure insert 26, thereby reducing the effective area of the piston 39 relative to the piston 38 for hydraulic action.

As indicated above, backlash in the gears and tolerances in the parts of the indexing drive mechanism have previously rendered the exact alignment between the stop pin holes 153 and the stop pin 155 at the completion of each indexing movement difficult and have required extremes in precision which have increased the cost of manufacture and assembly of indexing machines of the class of the present invention. By the construction shown, compensation may be made for the backlash and tolerances in the indexing drive mechanism. An essentially exact alignment between the table 18 and the indexing mechanism may be achieved before the table 18 is positively keyed to the hub 113 by the dowels 130. Prior to drilling for the dowels 130, and while the clamping ring 123 is loosely held by the bolts 125 to permit free rotation between the table 18 and hub 113, the table 18 is adjusted relative to the hub 113 in accurate operative alignment with the other parts of the indexing mechanism. The ring 123 is then tightened by the bolts 125 to clamp the table 18 and hub 113 together for rotation as a unit. At this stage, the indexing mechanism may be run through several indexing cycles to check the accuracy of the alignment between the stop pin holes 153 and the stop pin 155 after each indexing movement. Upon verification of the proper alignment between the table 18 and the indexing mechanism, dowel holes for the dowels 130 are drilled and reamed through the overlapping table portion 131 and hub shoulder 128, and the dowel pins 130 are inserted to positively secure the table 18 in proper alignment with the hub 113.

Having thus described my invention, I claim:

1. In an indexing machine having an indexing mechanism, a rotatable hub driven by said indexing mechanism, and a rotatable table piloted on said hub, means for adjustably aligning said table with said hub and other parts of said indexing mechanism and including clamping means for selectively clamping said table and hub together for rotation as a unit, said table being rotatable relative to said hub upon loosening said clamping means.

2. Means as claimed in claim 1 and being further characterized in that said table and hub provide overlapping portions and in that said clamping means are disposed for pressing said overlapping portions together in friction contact with each other and include a clamping ring disposed around the axis of rotation of said hub and table on one side of said overlapping portions, and also include screw-threaded means for clamping one of said overlapping portions between said ring and the other of said overlapping portions.

3. In an indexing machine having a rotatable table adapted to pilot on a rotatable hub, the combination of a stationary table support underlying said table, a bearing support concentric with said table near the periphery thereof and including paired annular bearing ways between said table and table support, a plurality of ball bearings supported within said bearing ways, and means for efficiently utilizing the wearing surfaces of said bearing ways and including a ball bearing holder for supporting said plurality of ball bearings in spiral alignment around the axis of rotation of said table.

4. In a mechanism for indexing a rotatable table through successive increments of rotation, the combination of an hydraulic cylinder, a reciprocating hydraulically actuated plunger having a pair of opposed pistons movable within said cylinder, one of said pistons having a smaller effective area exposed to hydraulic action than the other of said pistons, means to selectively actuate said plunger and including hydraulic fluid ducts communicating with the opposite ends of said hydraulic cylinder and operatively coupled within a controlled hydraulic system to a source of hydraulic pressure, an operable indexing linkage between said plunger and said table for indexing the latter upon movement of said plunger in a direction from said smaller area toward said larger area, the return stroke of said plunger toward said smaller area being hydraulically actuated, by virtue of the area differential between said pistons, upon connecting the said ducts at opposite ends of said hydraulic cylinder with said hydraulic pressure source.

5. The combination in a mechanism as claimed in claim 4 and being further characterized in that said area differential between said pistons is achieved by a cylindrical sleeve insert within one end of said hydraulic cylinder.

6. In a machine for indexing a rotatable table through successive increments of rotation, the combination of an hydraulic cylinder, a reciprocating hydraulically actuated plunger having a pair of opposed pistons movable within said cylinder, one of said pistons having a smaller effective area exposed to hydraulic action than the other of said pistons for forcing said plunger in a direction from said larger area toward the smaller area upon application of equal hydraulic pressures on said two pistons, means for selectively moving said plunger hydraulically in a direction from said smaller area toward said larger area and including controlled means for selectively delivering hydraulic pressure from said hydraulic pressure source to said piston of smaller area and for releasing hydraulic pressure from said piston of larger area, an operable indexing linkage between said plunger and said table for indexing the latter upon movement of said plunger toward said larger area, means to utilize the area differential between said pistons for hydraulically moving said plunger toward said smaller area and thereby to permit use of essentially the full power of said pressure source for other purposes and including controlled means for selectively delivering hydraulic pressure from said hydraulic pressure source against said opposed pistons simultaneously.

RUSSEL A. SCHULTZ.

REFERENCES CITED

The following references are of record in the file of this patent:

UNITED STATES PATENTS

| Number | Name | Date |
| --- | --- | --- |
| 1,476,703 | Forman | Dec. 11, 1923 |
| 1,480,937 | Gottschalk | Jan. 15, 1924 |
| 1,504,513 | Ruffner | Aug. 12, 1924 |
| 1,797,139 | Gorton | Mar. 17, 1931 |
| 1,923,204 | Hirvonen | Aug. 22, 1933 |
| 1,942,927 | Johnson et al. | Jan. 9, 1934 |
| 2,068,084 | Stahlhammer | Jan. 19, 1937 |
| 2,114,911 | Burt | Apr. 19, 1938 |
| 2,261,052 | Coffin et al. | Oct. 28, 1941 |
| 2,262,103 | Laessker | Nov. 11, 1941 |

FOREIGN PATENTS

| Number | Country | Date |
| --- | --- | --- |
| 1,341 | Great Britain | Mar. 20, 1882 |
| 408,394 | Great Britain | Apr. 12, 1934 |
| 539,746 | Great Britain | Sept. 23, 1941 |